United States Patent
Schwarz et al.

(10) Patent No.: US 11,327,766 B2
(45) Date of Patent: May 10, 2022

(54) INSTRUCTION DISPATCH ROUTING

(71) Applicant: International Business Machines Corporation, Armonk, NY (US)

(72) Inventors: Eric Mark Schwarz, Gardiner, NY (US); Brian W. Thompto, Austin, TX (US); Kurt A. Feiste, Austin, TX (US); Michael Joseph Genden, Austin, TX (US); Dung Q. Nguyen, Austin, TX (US); Susan E. Eisen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/945,404

(22) Filed: Jul. 31, 2020

(65) Prior Publication Data

US 2022/0035636 A1    Feb. 3, 2022

(51) Int. Cl.
*G06F 9/38* (2018.01)
*G06F 9/30* (2018.01)

(52) U.S. Cl.
CPC ........ *G06F 9/3855* (2013.01); *G06F 9/30036* (2013.01); *G06F 9/3802* (2013.01)

(58) Field of Classification Search
None
See application file for complete search history.

(56) References Cited

U.S. PATENT DOCUMENTS

| | | | |
|---|---|---|---|
| 6,336,183 B1 | 1/2002 | Le | |
| 6,609,190 B1 * | 8/2003 | Kahle | G06F 9/384 712/214 |
| 7,441,101 B1 * | 10/2008 | Steiss | G06F 9/3802 712/205 |
| 7,657,883 B2 * | 2/2010 | Jensen | G06F 9/3802 717/161 |
| 8,140,876 B2 * | 3/2012 | Arnold | G06F 1/3287 713/320 |
| 9,021,493 B2 | 4/2015 | Busaba | |
| 9,250,904 B2 | 2/2016 | Gschwind | |

(Continued)

FOREIGN PATENT DOCUMENTS

| | | |
|---|---|---|
| CN | 104137081 A | 11/2014 |
| CN | 104583975 A | 4/2015 |

(Continued)

OTHER PUBLICATIONS

Ramsay, M., Dataflow Dominance, 2003, Univ of Wisconsin-Madison, 18 pages. (Year: 2003).*

(Continued)

*Primary Examiner* — Eric Coleman
(74) *Attorney, Agent, or Firm* — Peter J. Edwards

(57) ABSTRACT

A method of instruction dispatch routing comprises receiving an instruction for dispatch to one of a plurality of issue queues; determining a priority status of the instruction; selecting a rotation order based on the priority status, wherein a first rotation order is associated with priority instructions and a second rotation order, different from the first rotation order, is associated with non-priority instructions; selecting an issue queue of the plurality of issue queues based on the selected rotation order; and dispatching the instruction to the selected issue queue.

24 Claims, 7 Drawing Sheets

(56) References Cited

U.S. PATENT DOCUMENTS

| | | | |
|---|---|---|---|
| 9,268,572 B2 | 2/2016 | Gschwind | |
| 9,558,001 B2* | 1/2017 | Khot | G06F 9/32 |
| 9,632,822 B2* | 4/2017 | Chang | G06F 9/50 |
| 10,387,147 B2 | 8/2019 | Genden | |
| 10,496,412 B2 | 12/2019 | Feiste | |
| 10,552,163 B2 | 2/2020 | Chan | |
| 2002/0178346 A1* | 11/2002 | Elias | G06F 9/3855 712/217 |
| 2003/0163671 A1* | 8/2003 | Gschwind | G06F 9/3838 712/214 |
| 2004/0216105 A1* | 10/2004 | Burky | G06F 9/3851 718/100 |
| 2004/0268097 A1 | 12/2004 | Mericas | |
| 2007/0074005 A1* | 3/2007 | Abernathy | G06F 9/3838 712/214 |
| 2010/0169616 A1* | 7/2010 | Wang | G06F 9/3836 712/216 |
| 2011/0219213 A1 | 9/2011 | Busaba | |
| 2013/0305022 A1 | 11/2013 | Eisen | |
| 2015/0082008 A1* | 3/2015 | Gschwind | G06F 9/30196 712/208 |
| 2015/0089194 A1 | 3/2015 | Gschwind | |
| 2015/0254077 A1* | 9/2015 | Boettcher | G06F 9/30018 712/4 |
| 2017/0060579 A1* | 3/2017 | Vincent | G06F 9/3871 |
| 2017/0228234 A1* | 8/2017 | Feiste | G06F 9/30145 |
| 2019/0026112 A1* | 1/2019 | Feiste | G06F 9/3824 |
| 2019/0163480 A1* | 5/2019 | Barrick | G06F 9/3863 |
| 2019/0163486 A1 | 5/2019 | Sinharoy | |
| 2019/0163487 A1* | 5/2019 | Sadasivam | G06F 9/30189 |
| 2019/0213133 A1 | 7/2019 | Frey | |
| 2019/0227805 A1* | 7/2019 | Carlson | G06F 9/28 |
| 2020/0167163 A1 | 5/2020 | Levenstein | |

FOREIGN PATENT DOCUMENTS

| | | |
|---|---|---|
| CN | 108762896 A | 11/2018 |
| CN | 111178791 A | 5/2020 |
| JP | 2007026365 A | 2/2007 |
| JP | 2007026366 A | 2/2007 |

OTHER PUBLICATIONS

Anonymous, "Age Tracking of Instructions in a Non-Shifting Issue Queue," IP.com, Disclosure No. IPCOM000243948D, Oct. 29, 2015, 4 pages. <https://ip.com/IPCOM/00024394​8>.

Anonymous, "Instruction steering policy for balanced utilization of a bifurcated unified issue queue," IP.com, Disclosure No. IPCOM000179961D, Mar. 3, 2009, 3 pages. <https://priorart.ip.com/IPCOM/000179961>.

Anonymous, "Issue Queue bypass readiness predictor," IP.com, Disclosure No. IPCOM000193323D, Feb. 18, 2010, 2 pages. <https://priorart.ip.com/IPCOM/000193323>.

Holzle et al., "Dynamic vs. Static Optimization Techniques for Object-Oriented Languages," CiteSeer, Nov. 2000, 29 pages, <https://azslide.com/download/dynamic-vs-static-optimization-techniques-for-object-oriented-languages_5a40c5691723ddf64e5ab16b.html>.

Slechta et al., "Dynamic Optimization of Micro-Operations," The Ninth International Symposium on High-Performance Computer Architecture, 2003. HPCA-9 2003. Proceedings, Feb. 12-12, 2003, 12 pages. <http://www.cs.ucr.edu/~gupta/hpca9/HPCA-PDFs/16-slechta.pdf>.

* cited by examiner

INSTRUCTION DISPATCH ROUTING

BACKGROUND

Processor cores having multiple issue queues driving multiple execution units typically utilize a mechanism for distributing dispatched instructions into these issue queues. Conventional processor cores typically accomplish this by sequentially distributing instructions by instruction order. That is, conventional processor cores dispatch instructions by starting at one issue queue and rotating through the issues queues sequentially assigning one instruction to each issue queue by instruction order. However, this conventional technique can cause performance degradation. For example, there is typically knowledge of which issue queues are full and then those queues are skipped in the rotation. However, reacting after over filling an issue queue is bad for performance. For performance purposes, it is desirable to give equal amount of work to each issue queue and it is not as simple as distributing the number of instructions equally to each issue queue as all instructions are not equal in terms of resources used.

SUMMARY

Aspects of the disclosure may include a method, processor, and, system for instruction dispatch routing. In one aspect a method comprises receiving an instruction for dispatch to one of a plurality of issue queues; determining a priority status of the instruction; selecting a rotation order based on the priority status, wherein a first rotation order is associated with priority instructions and a second rotation order, different from the first rotation order, is associated with non-priority instructions; selecting an issue queue of the plurality of issue queues based on the selected rotation order; and dispatching the instruction to the selected issue queue.

In another aspect, a method comprises receiving a plurality of instructions in a cycle, the plurality of instructions including one or more instructions designated as resource intensive and one or more instructions designated as non-resource intensive; dispatching each of the one or more instructions designated as resource intensive to a respective one of a plurality of issue queues according to a first rotation order; and dispatching each of the one or more instructions designated as non-resource intensive to a respective one of the plurality of issue queues according to a second rotation order opposite to the first rotation order.

In another aspect, a processor comprises an instruction fetch unit; a dispatch unit communicatively coupled to the instruction fetch unit; and a plurality of issue queues communicatively coupled to the dispatch unit. The dispatch unit is configured to receive a plurality of instructions from the instruction fetch unit; determine a respective priority status for each of the plurality of instructions; and select a rotation order for each of the plurality of instructions based on the respective priority status. A first rotation order is associated with priority instructions and a second rotation order, different from the first rotation order, is associated with non-priority instructions. The dispatch unit is further configured to select a respective issue queue of the plurality of issue queues for each of the plurality of instructions based on the respective selected rotation order; and dispatch each of the plurality of instruction to the respective selected issue queue.

In another aspect, a computer system comprises a memory configured to store program code; and a processor communicatively coupled to the memory and configured to execute the program code. The processor comprises an instruction fetch unit; a dispatch unit communicatively coupled to the instruction fetch unit; and a plurality of issue queues communicatively coupled to the dispatch unit. The dispatch unit is configured to receive a plurality of instructions in a cycle. The plurality of instructions include one or more instructions designated as resource intensive and one or more instructions designated as non-resource intensive. The dispatch unit is configured to dispatch each of the one or more instructions designated as resource intensive to a respective one of the plurality of issue queues according to a first rotation order; and dispatch each of the one or more instructions designated as non-resource intensive to a respective one of the plurality of issue queues according to a second rotation order opposite to the first rotation order.

The above summary is not intended to describe each illustrated embodiment or every implementation of the present disclosure.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
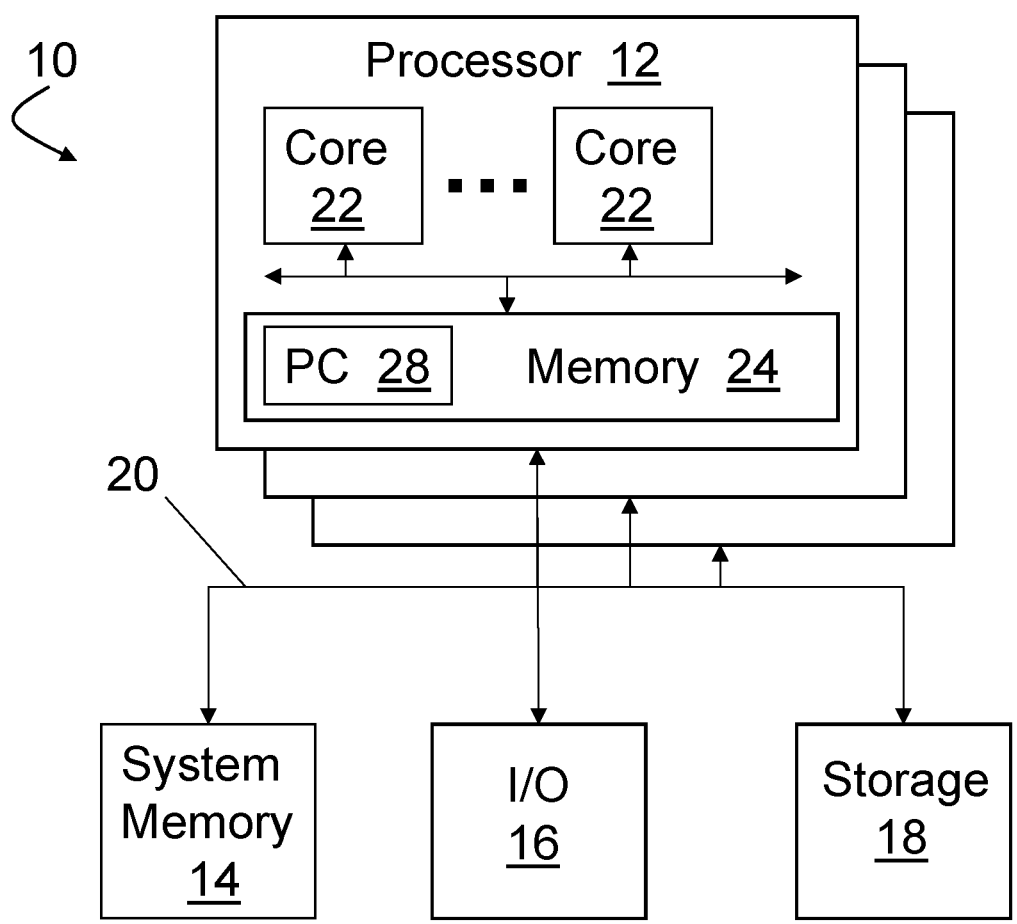
FIG. 1 is a high-level block diagram illustrating one embodiment of an example computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below . . . .

FIG. 1 is a high-level block diagram illustrating one embodiment of an example computer system 10. Computer system 10 includes one or more processors 12 coupled to various additional components such as system memory 14, input/output (I/O) 16 and storage 18 via one or more communication paths 20, e.g., implemented using one or more buses, networks, interconnects, etc. Each processor 12 may include one or more processor cores 22 and local storage 24, e.g., including internal system memory and/or one or more levels of cache memory. Each processor 12 may be similarly configured in some embodiments, while in other embodiments differently-configured processors may be utilized together. Further in multi-core processor implementations, each core 22 may be similarly or differently configured as other cores 22 within the same processor 12. It will be appreciated that the embodiments described herein may be utilized in a wide variety of system configurations, including single processor and/or multi-processor configurations, as well as single core and/or multi-core configurations. Further, the embodiments described herein may be utilized in various types of application-specific processors, e.g., graphics processors, network processors, coprocessors, service processors, embedded processors, etc.

In some embodiments, system memory 14 may include random-access memory (RAM) representing the main volatile storage of the system. Further, in some embodiments, a single system memory 14 may be supported, while in other embodiments, the memory may be distributed among a plurality of nodes, with one or more processors 12 implemented within each node and having non-uniform memory access among portions of the memory that are in the same or different nodes in the system. Nodes may also be arranged into various hierarchies, e.g., within different cabinets, racks, cards, slots, etc., and interconnected via high speed networks.

System 10 also includes various input/output (I/O) interfaces and devices 16, which may vary based upon the type of system. For example, in some systems, I/O 16 may include adapters and/or interfaces to one or more external networks, such as private networks, public networks, wired networks, wireless networks, etc. In addition, for a single-user system such as a desktop computer, laptop computer, tablet, mobile device, etc., I/O 16 may also include user input devices such as mice, keyboards, touchscreens, microphones, imaging devices, etc. for receiving user input and graphical displays and/or audio playback devices for displaying information. System 10 may also include a storage subsystem 18, which may include non-removable mass storage drives such as solid state disk drives, hard disk drives, etc., as well as removable drives such as flash drives, optical drives, etc., the latter of which may be used, for example, to read program code and/or data stored on a computer readable medium such as an optical disk.

Example program code 28, for example, is illustrated in memory 24, which may represent various types of instructions that may be executed by a core 22 of a processor 12, including, for example, user-level applications, operating systems, firmware, middleware, device drivers, virtualization program code, etc. It will be appreciated that program code 28 may also be stored from time to time in other computer readable media, including both various types of non-volatile and volatile memory such as cache memory, system memory, external storage, removable media, etc.

While the system of FIG. 1 is used to provide an illustration of a system in which the embodiments described herein can be implemented, it is understood that the depicted architecture is not limiting and is intended to provide an example of a suitable computer system in which the various techniques disclosed herein may be applied.

Further, it will be appreciated that the techniques described herein may be implemented within a circuit arrangement, which generally represents a physical device or system (e.g., one or more integrated circuit devices/chips, cards, boards, components, systems, etc.) incorporating hardware, and in some instances, software, configured to implement such techniques. In addition, it will also be appreciated that implementations utilizing the herein-described techniques may be distributed at least in part in the form a program product including logic definition code that defines a circuit arrangement and that is stored on a computer readable medium, and that the invention applies equally regardless of the particular type of computer readable media being used to actually carry out the distribution. Logic definition program code, for example, may include generic gate netlists, synthesizable forms, e.g., as described in a hardware description language such as Verilog or VHDL, lower-level, physical descriptions such as GDSII, or other types of program code capable of defining at various levels of detail the functionality and/or layout of a manufactured circuit arrangement. Examples of computer readable media include, but are not limited to, non-transitory, physical, recordable type media such as volatile and non-volatile memory devices, floppy disks, hard disk drives, CD-ROMs, and DVDs (among others).

Figure 2:
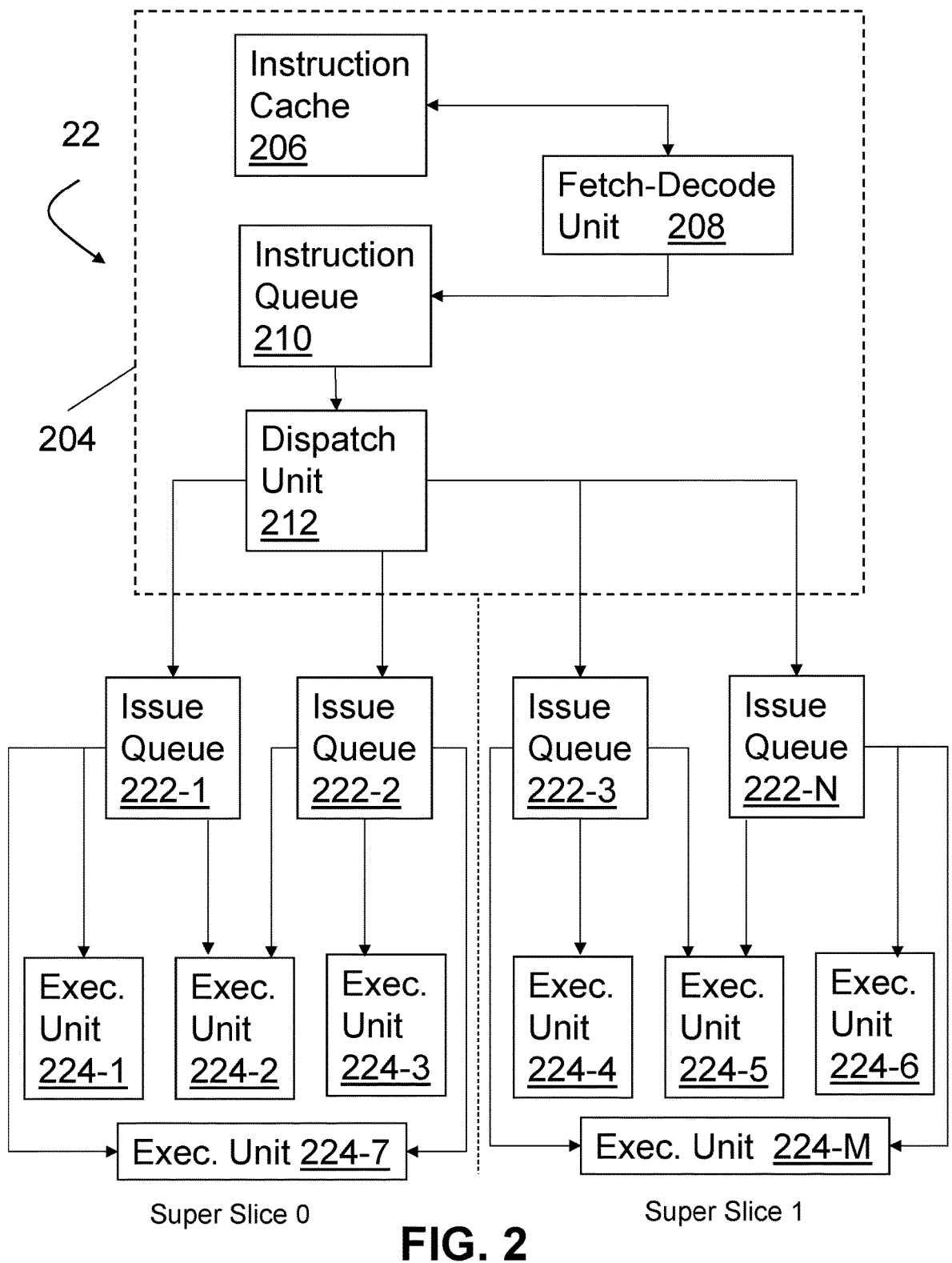
FIG. 2 is a high-level block diagram of one embodiment of an example processor core.

Further details of a processor core 22 are shown and described with respect to FIG. 2. In one example, the processor is a super-scalar processor, which retrieves instructions from memory (e.g., system memory 14 of FIG. 1) and loads them into instruction sequencing logic (ISL) 204 of the processor. The instruction sequencing logic 204 includes, for instance, a Level 1 Instruction cache (L1 I-cache) 206, a fetch-decode unit 208, an instruction queue 210 and a dispatch unit 212. In one example, the instructions are loaded in L1 I-cache 206 of ISL 204, and they are retained in L1 I-cache 206 until they are required or replaced if they are not needed. Instructions are retrieved from L1 I-cache 206 and, in one embodiment, are grouped into instruction groups and decoded by fetch-decode unit 208 (also referred to herein as the instruction fetch unit 208). After decoding a current instruction, the current instruction is loaded into instruction queue 210. Dispatch unit 212 dispatches instructions from instruction queue 210 into one of a plurality of issue queues 222-1 . . . 222-N (collectively referred to herein as issue queues 222), where N is the total number of issue queues. In this example, the processor core 22 includes 4 issue queues 222. However, it is to be understood that, in other embodiments, more or fewer than 4 issue queues 222 can be used.

The issue queues 222 each issue a current instruction to one of execution units 224-1 . . . 224-M (collectively referred to herein as execution units 224), where M is the total number of execution units. Issue queues 222 may contain, for example, instructions of floating-point type, fixed-point type, and/or load/store instructions. However, it should be appreciated that any number and types of instructions can be used. For example, the types of instructions can include, but are not limited to fixed-point arithmetic, Matrix Multiply and Accumulate (MMA), Vector Scalar Unit (VSU), and load/store (LS) instructions. In this example, the processor core 22 includes 8 execution units 224 for executing the instructions received from issue queues 222. However, it is to be understood that, in other embodiments, more or fewer than 8 execution units 224 can be used. Each of the execution units 224 can be implemented or configured to execute one or more types of instructions. For example, the execution units 224 can include, but are not limited to, Matrix Multiply and Accumulate (MMA), Vector Scalar Unit (VSU), and load/store (LS) units.

For instance, in one example embodiment, each of the issue queues 222 are tied to a separate Vector Scalar Unit (e.g. execution units 224-1, 224-3, 224-4, and 224-6). Also, in this example, 2 issue queues 222 drive 1 load/store unit for a total of 2 load/store units per core (e.g. execution units 224-2 and 224-5). Similarly, 2 issue queues drive 1 Matrix Multiply and Accumulate unit for a total of 2 MMA units per core (e.g. execution units 224-7 and 227-M). Additionally, in the example embodiment of FIG. 2, the processor core 22 can be split in two when operating in a mode referred to as Simultaneous multithreading (SMT) 4 mode. In SMT4 mode, the core 22 is configured to handle 2 threads per side taking 2 issue queues, 1 load/store unit, and 1 MMA unit per side, for example. In SMT4 mode each side routes 4 instructions to at most 2 issue queues with even and odd half-slices for a total of 4 half-slices per side. The sides are labelled as super slice 0 and super slice 1 in FIG. 2. When operating in a mode referred to as SMT2 mode or in a mode referred to as single thread (ST) mode, the core 22 is unified (i.e. not divided into super slices or sides) and 8 instructions are dispatched to one of the 4 issue queues in the even or odd slice for a total of 8 half-slices.

Each issue queue 222 is also referred to herein as a slice. Additionally, each issue queue 222 has 2 slots referred to herein as even and odd half-slices, discussed in more detail below. In SMT2 mode, all the instructions for each cycle (e.g. 8 instructions) are assigned to one of the 4 issue queues 222 in the even or odd slice for a total of 8 half-slices. In SMT4 mode, each side or super slice routes half of the instructions per cycle (e.g. 4 instructions) to at most 2 issue queues with even and odd slices for a total of 4 half-slices per side or super slice.

Processor cores having multiple issue queues driving multiple execution units utilize a mechanism for distributing dispatched instructions into these issue queues. Conventional processor cores typically accomplish this by sequentially distributing instructions by instruction order. That is, conventional processor cores dispatch instructions by starting at one issue queue and rotating through the issues queues sequentially assigning one instruction to each issue queue by instruction order. However, this conventional technique can cause performance degradation. For example, there is typically knowledge of which issue queues are full and then those queues are skipped in the rotation. However, reacting after over filling an issue queue is bad for performance. For performance purposes, it is desirable to give equal amount of work to each issue queue and it is not as simple as distributing the number of instructions equally to each issue queue as all instructions are not equal in terms of resources used.

If instructions are merely dispatched sequentially, as in conventional systems, then situations can arise in which all of a same instruction type, such as VSU instructions or MMA instructions, go to the same issue queue that feeds only 1 VSU or MMA unit and thus does not spread the work around to be executed in parallel. For instance, if every fourth instruction is a VSU instruction and the instructions are simply dispatched sequentially, then all VSU instructions can end up being dispatched to the same issue queue and, thus, the same VSU execution unit. This creates a local bottleneck on completion from the one VSU and delays the execution of the whole workload.

In the embodiments described herein the dispatch unit 212 is configured to overcome the performance issues of conventional processor cores by implementing novel dispatch techniques which can be performed efficiently and quickly. In particular, the circuits in the processor core execute at a very high frequency. Thus, the dispatch techniques implemented in the dispatch unit 212 are configured to be buildable in a high performance circuit enabling the dispatch unit 212 to quickly determine or select the issue queue 222 for a given instruction. This enables the dispatch unit to balance the weight or load on each issue queue 222 approximately equally while also performing such routing sufficiently quickly, relative to the high execution frequency of the circuits in the processor core 22, so as not to become a performance bottleneck.

At a high level, the dispatch unit 212 is configured to implement two different and separate rotation orders. One rotation order is associated with instruction types designated as priority/optimal instruction types and the other rotation order is associated with instructions types designated as non-priority/non-optimal instruction types. In some embodiments, the selection of priority/optimal instruction types can be based on the types of instructions that can clog an issue queue (which can be determined, for example, based on the length of their pipeline, especially for data dependencies.) In some embodiments, the instruction types designated as priority can be selected a priori. Furthermore, in some embodiments, only one instruction type (e.g. MMA, VSU, or L/S) is designated as a priority instruction. In other embodiments, more than one instruction type can be designated as a priority instruction.

As an example, in some embodiments, 8 instructions per cycle are received from the instruction fetch unit 208. In some such embodiments, the priority instructions are marked by an 8-bit vector sent from the instruction fetch unit 208 with, for example, 1 representing an optimal or priority instruction and 0 representing a non-optimal or non-priority instruction. As described in more detail below, the dispatch unit 212 is configured to remember or keep track of the issue queue number for the next rotation dispatch for each type of instruction. For example, in some embodiments, 2-bit latches for 4 types of instructions are used to keep track of the issue queue number for the next rotation dispatch of that type of instruction. Furthermore, in some embodiments, switches can be used to statically choose which type of instruction to designate as optimal/priority.

Additionally, in some embodiments, the instruction type designated as priority instructions can be changed dynamically from cycle to cycle rather being statically assigned a priori. In some such embodiments, the instruction fetch unit 208 sends the type of instruction to be prioritized to the dispatch unit 212. For example, in some such embodiments, a hierarchy of priority for the instruction types is used to assign the priority instruction type for a given cycle based on the instruction types in that cycle. As an example, in one such embodiment, MMA instructions have the highest priority, then VSU instructions, then L/S instructions and then fixed-point arithmetic. Thus, in such an embodiment, if one or more MMA instructions are present in a given cycle then the MMA instructions are assigned the priority instruction type while VSU, L/S, and fixed-point arithmetic instructions are considered non-priority instructions. However, if an MMA instruction is not present in a given cycle, but one or more VSU instructions are in that cycle, then the VSU instructions are assigned the priority instructions type for that cycle, etc. This dynamic selection of priority instruction type can be performed, in some embodiments, in the instruction fetch unit 208 and communicated to the dispatch unit 212. In some embodiments, switches can be used to turn on/off dynamic changing of priority instruction types as well as other functions, such as to indicate the selected priority instruction type and to force rotation, as discussed in more detail below.

Additionally, in some other embodiments involving dynamic designation of instruction types as priority, the dispatch unit 212, the instruction fetch unit 208 or another unit in the processor core is configured to observe workloads over a rolling window of previous cycles (e.g. 20 cycles). Based on the observed workloads of prior cycles, an instruction type is selected as the priority instruction type for the next cycle. For example, in some such embodiments, if an MMA instruction type is observed in any of the last 20 cycles, then the MMA instruction type can be selected as the priority instruction type for the next cycle. If an MMA instruction type has not been observed in the last 20 cycles, then a different instruction type (e.g. VSU) can be selected as the priority instruction type for the next cycle. Thus, rather than switching each instruction cycle, the instruction type considered as the priority instruction type is switched less periodically (e.g. after 10 or 20 cycles depending on the size of the rolling window).

Given the designated priority instruction type for a given cycle, the dispatch unit 212 is configured to dispatch any priority instructions according to a first rotation order associated with priority instructions and to dispatch any other instructions in the cycle according to a second rotation order, different from the first rotation order, associated with non-priority instructions. Each of the first and second rotation orders defines a respective direction for rotating through the issue queues 222 as well as an amount to adjust the rotation, as described in more detail below with respect to FIGS. 3 and 4. In some embodiments, the dispatch unit 212 can be comprised of various logic gates to determine where to dispatch the instructions based on various received bits and switches, as described herein.

Figure 3:
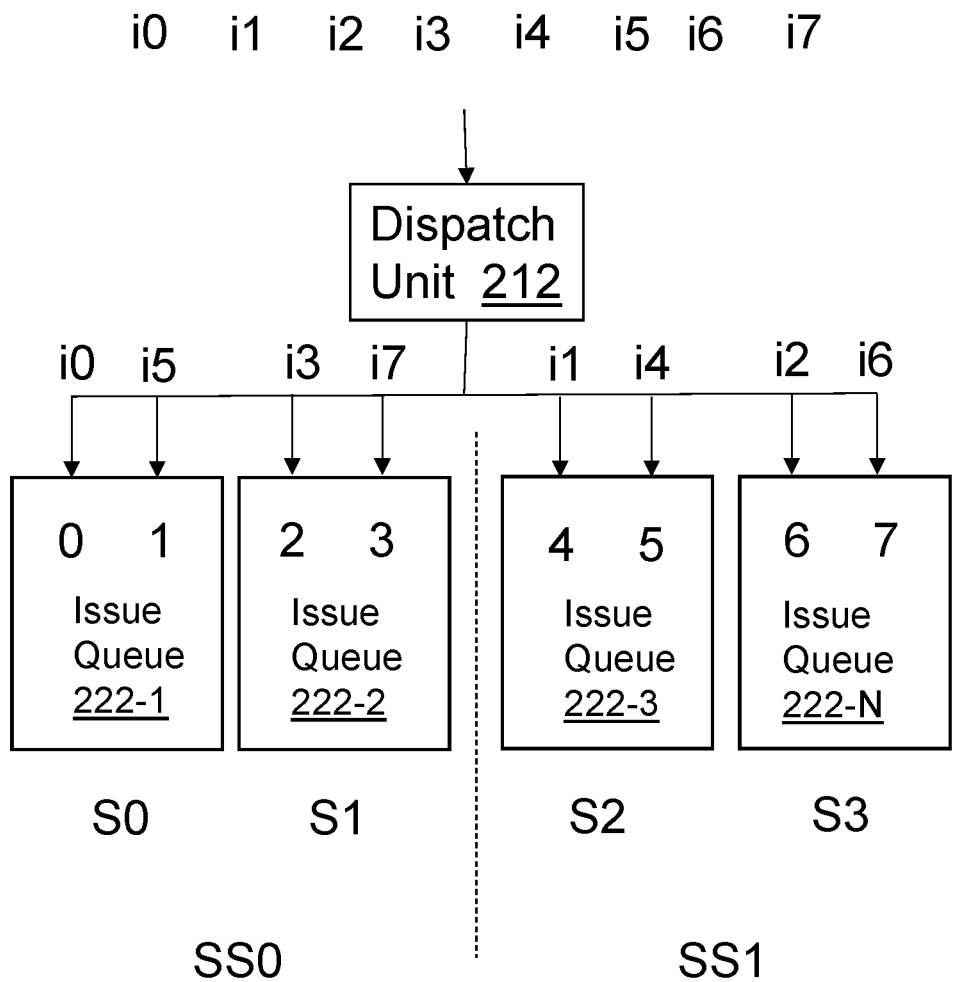
FIG. 3 is a partial view of one embodiment of the processor core of FIG. 2.

FIG. 3 is a partial view of one embodiment of processor core 22 depicting only the dispatch unit 212 and the issue queues 222. In particular, FIG. 3 depicts one embodiment of dispatching instructions in a single cycle to issue queues 222. In the example shown in FIG. 3, the cycle includes 8 instructions (labelled i0 through i7) that are received at the dispatch unit 212 from the instruction fetch unit 208. In this example, instructions i0 and i1 have an instruction type designated as a priority instruction type for this cycle. Instructions i2 through i7 have an instruction type designated as non-priority instructions in this example. In some embodiments, the dispatch unit 212 is configured to determine the instruction type of each instruction in the cycle based on information sent from the instruction fetch unit 208. For example, the instruction fetch unit 208 can set one or more bits sent along with the decoded instructions. In other embodiments, the dispatch unit 212 determines the instruction type of each instruction using different techniques.

In this embodiment, due to the architecture of the processor core 22, the instructions are dispatched sequentially from i0 to i7. That is, in order for instruction i1 to be dispatched, instruction i0 needs to have been dispatched first, and so forth. Since instructions i0 and i1 are designated as priority instructions in this example, a first rotation order is selected for dispatching instructions i0 and i1 while a second rotation order is selected for dispatching instructions i2 through i7. The first and second rotation orders can be described with respect to the slice number and half-slice number. For example, the issue queues 222-1, 222-2, 222-3, and 222-N are also referred to as slice 0 (S0), slice 1 (S1), slice 2 (S2), and slice 3 (S3), respectively. Additionally, as discussed above, each issue queue has 2 slots or half-slices. The slots or half-slices are labelled sequentially as 0, 1, 2, 3, 4, 5, 6, and 7. Each issue queue has an even half-slice (0, 2, 4, or 6) and an odd half-slice (1, 3, 5, or 7).

In this embodiment, the first rotation order specifies a slice order of 0-2-1-3. Thus, the first rotation order begins with slice 0 (issue queue 222-1) for the first priority instruction, then rotates to slice 2 (issue queue 222-3) for the next priority instruction, then rotates to slice 1 (issue queue 222-2) for the next priority instruction, and then rotates to slice 3 (issue queue 222-N) for the next priority instruction. If there are more than 4 priority instructions, then the first rotation order starts over at slice 0. The second rotation order for non-priority instructions, in this example, specifies a slice order of 3-1-2-0. Thus, the second rotation order begins with slice 3 (issue queue 222-N) for the first non-priority instruction, then rotates to slice 1 (issue queue 222-2) for the next non-priority instruction, then rotates to slice 2 (issue queue 222-3) for the next non-priority instruction, and then rotates to slice 0 (issue queue 222-1) for the next non-priority instruction. If there are more than 4 non-priority instructions, then the second rotation order starts over at slice 3.

As can be seen, the first and second rotation orders each define a starting point as well as a rotation direction and amount for each rotation (e.g. rotate to the right 2 slices, rotate to the left 1 slice, etc.). In particular, the starting point, rotation directions and rotation amounts defined by the second rotation order are essentially opposite from the starting point, rotation directions, and rotation amounts defined by the first rotation order. In addition, in this example, the dispatch unit is configured to select first the even half-slices for each slice and then the odd half-slices for each slice in a given cycle. For example, the first instruction, whether priority or non-priority, dispatched to slice 0 (issue queue 222-1) is dispatched to half-slice or slot 0. Similarly, the first time an instruction, whether priority or non-priority, is dispatched to the other slices, the instruction is dispatched to the even half-slice (i.e. 2, 4, or 6). The next time an instruction, whether priority or non-priority, is dispatched to slice 0 (or one of the other slices), the subsequent instruction is dispatched to the odd half-slice (i.e. 1, 3, 5, or 7).

Thus, the dispatch unit 212 is configured to keep track of or remember at which point in both the first rotation order and the second rotation order the dispatch unit 212 is for each subsequent instruction as well as whether to use the even or odd half-slice for that slice. In addition, in some embodiments, the dispatch unit 212 remembers the point in both the first rotation order and the second rotation order across cycles. That is, rather than resetting the first and second rotation orders with the start of each cycle, the dispatch unit 212 remembers at what point in each of the first and second rotation orders the dispatch unit 212 is at the end and beginning of each cycle. For example, if at the end of a given cycle the dispatch unit dispatched a priority instruction to slice 2, then the next priority instruction in a subsequent cycle will be sent next to slice 1 using the example rotation discussed above. Additionally, in some embodiments, the dispatch unit 212 tracks the last half-slice used for each slice across cycles, as mentioned above. For example, the dispatch unit 212 can track whether the last instruction sent to slice 1 was to the odd or even half-slice such that the next subsequent instruction sent to slice 1, whether in the same cycle or a subsequent cycle, will be sent to the other half-slice on slice 1.

Furthermore, in addition to tracking the last issue queue used for the priority and non-priority rotation orders, in some embodiments, the dispatch unit 212 is configured to track the last issue queue used for each instruction type. Thus, in embodiments where there are 4 different instruction types, for example, the dispatch unit 212 is configured to track the last issue queue used for each of the 4 different instruction types. In embodiments involving dynamic selection of the priority instruction type, for example, at the beginning of each instruction cycle the dispatch unit 212 adjusts the start of the priority rotation order based on the last issue queue used for the instruction type selected as the priority instruction type for that instruction cycle. In particular, the dispatch unit 212 sets the first or starting issue queue for the priority rotation order of that instruction cycle as the next issue queue in the priority rotation order after the last issue queue used for the priority instruction type. The non-priority rotation order is then adjusted to be opposite to the priority rotation order. In other words, the starting issue queue in the non-priority issue queue is opposite to the starting issue queue of the priority rotation order.

In some embodiments, the dispatch unit 212 utilizes a 2-bit encoded or 4-bit decoded value to track which issue queue to use next for each of the first and second rotation orders. For example, the next rotation number can be picked from the previous rotation state latches and this can be expanded to a 4-bit orthogonal signal that is rotated 1 bit to the right after every priority instruction. An opposite 4-bit orthogonal signal is used for non-priority instructions and is rotated 1 bit to the left after every non-priority instruction. Thus, each instruction is examined sequentially and the priority instruction receives the optimal rotation while the non-priority instructions are rotated in the opposite direction starting at the last choice for the priority instruction. In this way, the dispatch unit 212 can track where in each of the first and second rotation orders, the dispatch unit 212 is currently at.

Thus, through the use of two separate rotation orders for priority and non-priority instructions and remembering the half-slice last used, the dispatch unit 212 is able to ensure a more even distribution of the workload across the issue queues 222 than conventional processor cores. For example, in a conventional processor, if an instruction requiring more resources occurs each $4^{th}$ instruction, then those more resource intensive instructions will be dispatched to the same queue which causes an imbalance in the workload distributed across the execution loads and results in lower performance. In contrast, in the same situation using embodiments described herein, the more resource intensive instructions can be labelled as priority instructions and dispatched differently from non-priority instructions. As such, in embodiments using the rotation orders described herein, the more resource intensive instructions (as well as the lower resource intensive instructions) will be more evenly distributed across the issue queues and, consequently, the execution units which results in improved performance as compared to conventional processors.

For example, in the embodiment shown in FIG. 3, the instructions i0 and i1 are designated as priority instructions (e.g. more resource intensive instructions) based, for example, on the instruction type. Thus, instructions i0 and i1 are dispatched according to the first rotation order. In this particular, example, instruction i0 is dispatched to slice 0 (issue queue 222-1). Since this is the first instruction dispatched to slice 0, instruction i0 goes to half-slice 0. Instruction i1 is then dispatched to slice 2 (issue queue 222-3). Again, since this is the first instruction to slice 2, instruction i1 goes to even half-slice 4. Instructions i2 through i7 are designated as non-priority instructions (e.g. less resource intensive as compared to the priority instructions) and, thus, are dispatched according to the second rotation order. In particular, instruction i2 is dispatched to slice 3 (issue queue 222-N). Since this is the first instruction dispatched to slice 3, instruction i2 goes to half-slice 6. Instruction i3 goes to even half-slice 3 in slice 1 (issue queue 222-1) since it is the first instruction dispatched to slice 1. Instruction i4 is dispatched to odd-half slice 5 in slice 2 (issue queue 222-3) since this is the second instruction dispatched to slice 2. Instruction i5 is dispatched to odd half-slice 1 in slice 0 since it is the second instruction dispatched to slice 0. The second rotation order then starts over at slice 3 and dispatch unit 212 dispatches instruction i6 to odd half-slice 7 in slice 3 and then instruction i7 is dispatched to odd half-slice 3 in slice 1.

In the next cycle, if instructions i0 and i1 were also priority instructions, instruction i0 would be dispatched to slice 1 and instruction i1 would be dispatched to slice 3. Thus, as can be seen, the priority instructions are dispatched to different issue queues and evenly distributed across the issue queues 222 for more parallel execution. In addition, the example rotation orders enable support for both 4-way and 2-way rotations. For example, in the example processor core 22 there are 2 MMA execution units. Thus, rotation of MMA instructions is a 2-way rotation. However, in the example of FIG. 2, there are 4 VSU execution units, so the rotation of VSU instructions is a 4-way rotation. However, as noted above, the first rotation order and the second rotation order are each configured to switch between super slice 0 (SS0) and super slice 1 (SS1) on each shift or rotation. Thus, the 4-way rotation supports a 2-way rotation in that instructions alternate between the two superslices. Furthermore, the embodiments described herein support SMT4 mode, SMT2 mode and ST mode, as discussed above. In particular, by ensuring that each rotation or switch alternates super slices, the first and second rotation orders are able to support embodiments having 1 or 2 super slices. In that way, the embodiments described herein can support SMT4, SMT2, and ST modes.

Furthermore, in SMT4 mode the processor core 22 is split in two so there is only a possible choice of 2 issue queues for each side. That is, the plurality of issue queues are divided into two groups that operate independently of each other. Each of the two groups can have a respective first rotation order for priority/resource intensive instructions and a respective second rotation order for non-priority/non-resource intensive instructions. Additionally, the instructions are divided between the two sides, in some embodiments. For example, instructions i0-i3 can be dispatched to super slice 0 and instructions i4-i7 are dispatched to super slice 1. This can be indicated by 1 bit, though information is tracked on both half cores for each group of possible instruction types (e.g. up to 4 instruction types). Thus, in some such embodiments, 8 total instruction types are tracked: the 4 types on super slice 0 and the 4 types on super slice 1. For each super slice or half core a 1 bit signal is passed for the optimal/priority instruction type rotation and a separate 1 bit signal for the non-optimal/non-priority instruction rotation. The non-optimal rotation starts out as the opposite of the start value for the optimal rotation. Each of the 4 instructions on a side are sequentially rotated using either the optimal or non-optimal rotation signal and the appropriate signal is flipped for each case of that type of instruction on each super slice. Thus, in some embodiments, each super slice can have a different priority instruction type (e.g. MMA on super slice 0 and VSU on super slice 1).

Furthermore, the dispatch unit 212 is configured to take into account busy issue queues, in some embodiments. For example, in the embodiment in FIG. 3, there are 8 instructions and 4 issue queues with 2 half-slices each. Some issue queues may be busy. If there are no busy issue queues then dispatching the instructions is a simple choice per one of the two rotation orders. If there are some busy issue queues, then the dispatch unit 212 implements a sequential dependency on the oldest instructions within the 8-instruction group, in some embodiments. For example, in some embodiments, to make cycle time, the dispatch unit 212 chooses to only schedule 4 instructions when there are some busy issue queues 222; otherwise there would be an 8-instruction dependency chain. Additionally, in some embodiments, if the issue queue pointed to by the rotation vector/rotation order is busy, then the next one in the rotation is checked, and then the next one, etc. If all the rest of the issue queues are busy, then this instruction and all younger instructions in the group are not dispatched, in some embodiments. Handling of busy issue queues/slices 222 can depend on the operation mode. For example, in some embodiments operating in SMT2 mode or ST mode, when one or more slices are busy, the dispatch unit 212 can be configured to dispatch the instructions as pairs rather than as individual instructions and to dispatch less than all of the instructions for the cycle (e.g. 4 instead of 8). In some embodiments operating in SMT4 mode, when one or more slices are busy, the dispatch unit 212 can be configured to dispatch, for each super slice, any instruction to any half-slice with a preference for even half-slices first.

Furthermore, in some other embodiments, the dispatch unit 212 is configured to force the rotation order rather than checking the next issue queue in the rotation if the issue queue pointed to by the rotation vector/rotation order is busy. In some such embodiments, a switch is used to force the rotation dependent on the instruction type. For example, when the force rotation switch is set to high, only the selected rotation issue queue pointed to by the rotation vector/rotation order is checked for not busy. If the indicated issue queue is not available then dispatch unit 212 stalls until the indicated issue queue is available. In some implementations, the choice for forcing rotation is dependent on the instruction type, as mentioned above. For example, in some implementations, MMA instructions are chosen to always turn on the force rotation signal whereas none of the other instruction types are chosen for turning on the force rotation signal. Since some instruction types, such as MMA instructions, can be relatively very long time running, performance can sometimes be improved by waiting for the indicated issue queue rather than to issue the long running instruction to a different issue queue earlier. In addition, in some embodiments, a programmable time limit is used to limit the amount of time that the dispatch unit 212 waits for the busy issue queue to become available. The programmable time limit can be measured, for example, in cycles or actual elapsed time, in some embodiments. In such embodiments using a programmable time limit, if the time limit is reached and the indicated issue queue is still busy, then the dispatch unit 212 moves to the next issue queue in the rotation order.

It is to be understood that the example first and second rotation orders discussed above with respect to FIG. 3 are provided by way of example only and that other rotation orders can be used in other embodiments. For example, in another embodiment the first rotation order specifies a slice order of 1-3-0-2 and the second rotation order specifies a slice order of 2-0-3-1. Additionally, in some embodiments, the dispatch unit 212 is configured to first dispatch instructions to the odd half-slice and then to the even half-slice of each issue queue 222. Furthermore, in yet other embodiments, the dispatch unit 212 can be configured to reset one or both of the first and second rotation orders for each cycle. It is further to be understood that the numbers of priority and non-priority instructions as well as the order of priority and non-priority instructions discussed herein are presented by way of example only and that the number and order of priority and non-priority instructions can be different for each cycle and embodiment. In particular, it is to be understood that all of the priority instructions are not necessarily contiguous or the first instructions in the cycle.

Figure 4:
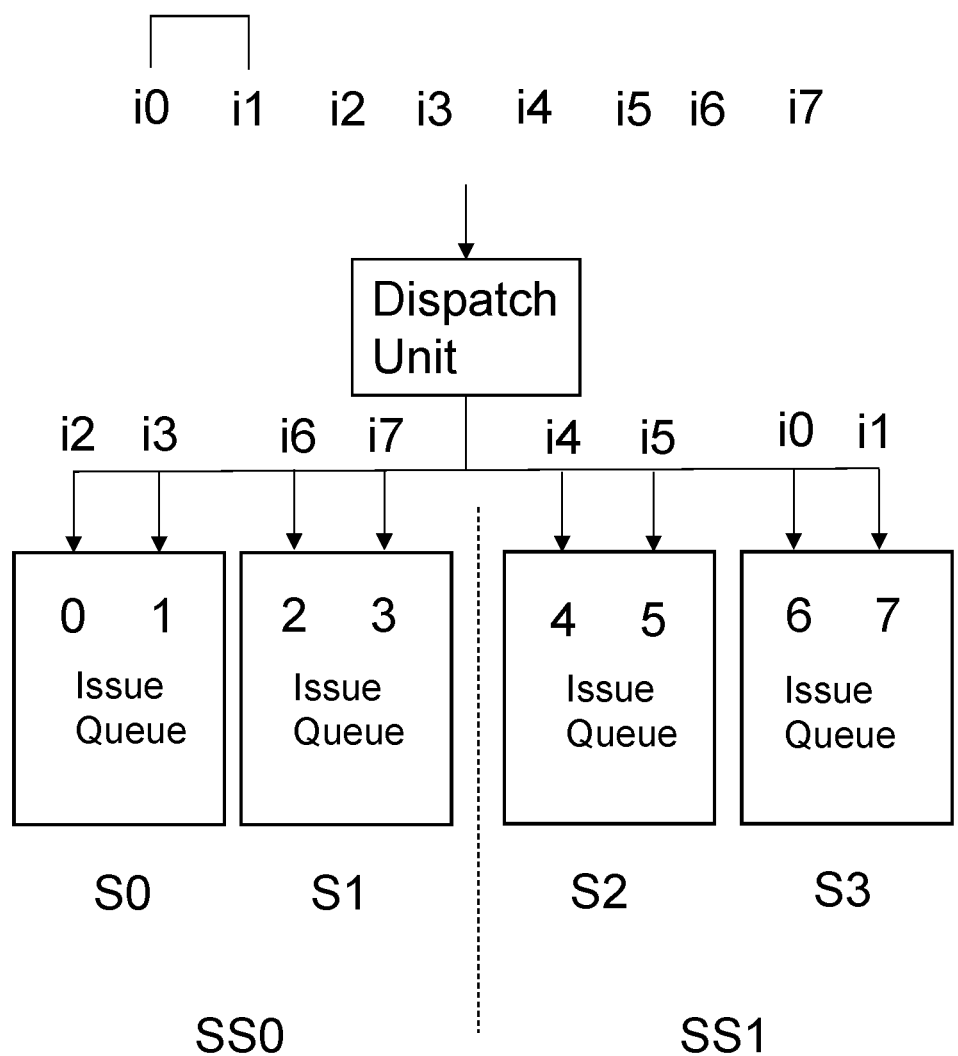
FIG. 4 is a partial view of one embodiment of the processor core of FIG. 2.

Additionally, in some embodiments, the dispatch unit 212 is configured to route paired instructions, as discussed with respect to FIG. 4. In particular, in the example shown in FIG. 4, instructions i0 and i1 are paired instructions. As used herein, paired instructions refer to instructions that are to be executed by the same execution unit. As such, dispatch unit 212 is configured to dispatch the paired instructions to the same issue queue 222. In addition, in this example, the instructions i0, i1, and i2 are designated as non-priority instructions and instructions i3 through i7 are designated as priority instructions. None of the instructions i2 through i7 are paired instructions. However, dispatch unit 212 is configured, in this example, to adapt the dispatch of instructions i0 through i7 to account for paired instructions i0 and i1. In particular, dispatch unit 212 is configured to dispatch all of the instructions i0 through i7 in pairs even though only instructions i0 and i1 are considered paired instructions.

For example, in this embodiment, instructions i0 and i1 are paired, non-priority instructions. Thus, instructions i0 and i1 are dispatched according to the second routing order associated with non-priority instructions. In the example of FIG. 4, the second routing instructions begin at slice 3. Thus, instruction i0 is dispatched to the even half-slice 6 of slice 3 and instruction i1 is dispatched to odd half-slice 7 of slice 3. Instructions i2 and i3 are also dispatched together as a pair. In this example, instruction i2 is non-priority and instruction i3 is a priority instruction. Hence, in this example, the instructions i2 and i3 are dispatched using the first routing order associated with priority instructions. Thus, instruction i2 is dispatched to even half-slice 0 of slice 0 and instruction i3 is dispatched to odd half-slice 1 of slice 0. However, in other embodiments, where one of the two instructions dispatched as a pair is a non-priority instruction, the pair of instructions can be dispatched according to the second routing order associated with non-priority instructions. In such embodiments, for example, the instruction i2 would be dispatched to even half-slice 2 of slice 1 and instruction i3 would be dispatched to odd half-slice 3 of slice 1.

Instructions i4 and i5 are priority instructions and dispatched according to the first routing order. Thus, in this example, instruction i4 is dispatched to even half-slice 4 of slice 2 and instruction i5 is dispatched to odd half-slice 5 of slice 2. Finally, instructions i6 and i7 are priority instructions and dispatched according to the first routing order as a pair. In this example, instruction i6 is dispatched to even half-slice 2 of slice 1 and instruction i7 is dispatched to odd half slice 3 of slice 1. Thus, the paired mode shown in FIG. 4 for dispatching instructions is similar to the individual mode of FIG. 3 in that it uses two separate routing orders for priority and non-priority instructions. However, in contrast to FIG. 3, the instructions are routed as pairs to the even and odd half-slices of the same slice rather than individually to one of the slices while alternating even and odd half-slices, as described above.

Figure 5:
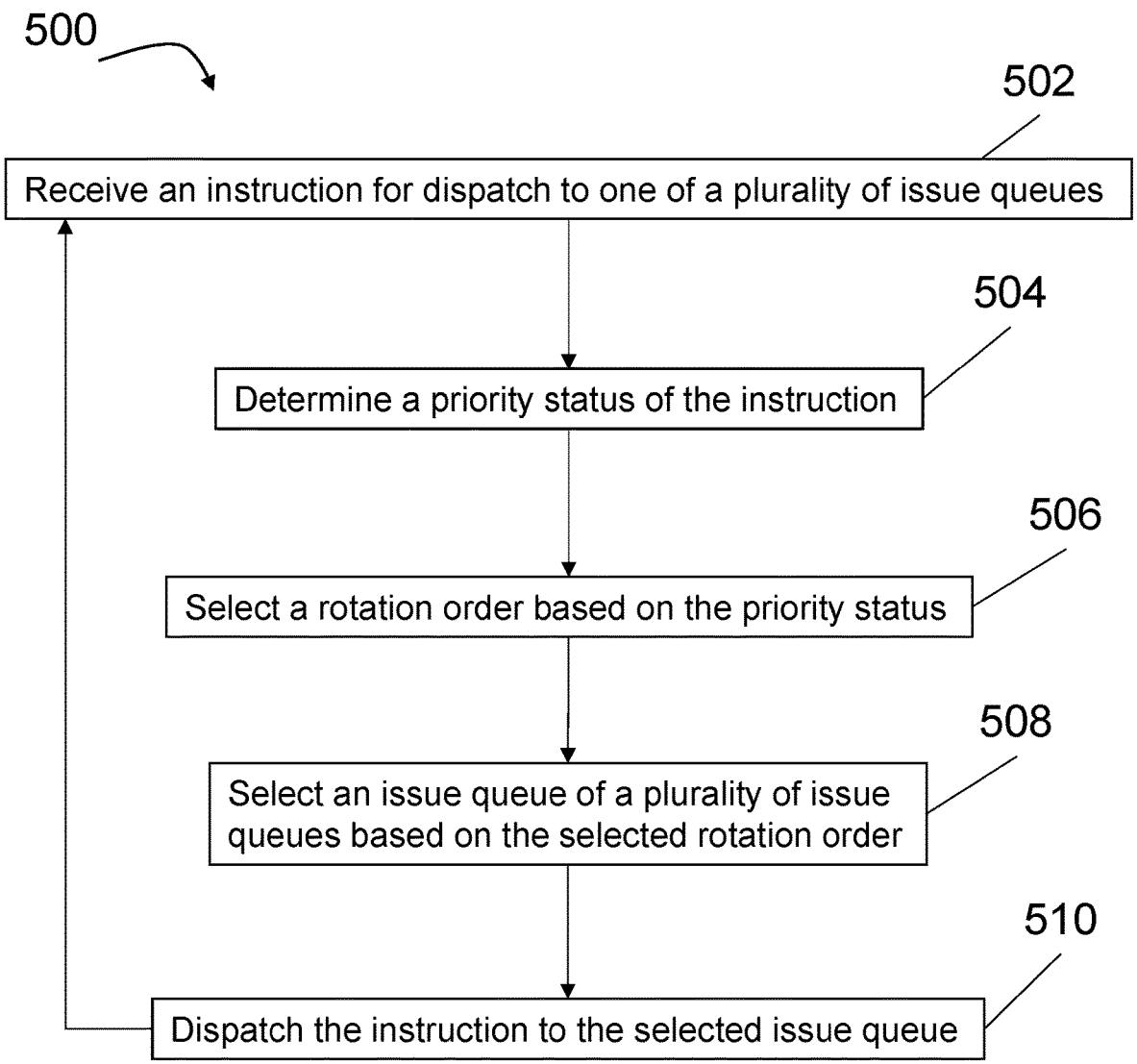
FIG. 5 is a flow chart depicting one embodiment of an example method of dispatching instructions.

FIG. 5 is a flow chart depicting one embodiment of an example method 500 of dispatching instructions. Method 500 can be implemented by a dispatch unit of a processor core, such as dispatch unit 212 discussed above. It is to be understood that the order of actions in example method 500 is provided for purposes of explanation and that the method can be performed in a different order in other embodiments.

Similarly, it is to be understood that some actions can be omitted or additional actions can be included in other embodiments.

At 502, an instruction for dispatch to one of a plurality of issue queues is received. For example, in each cycle a plurality of instructions can be received from an instruction fetch unit, as described above. One or more of the instructions in each cycle can be designated as a priority or optimal instruction. As discussed above, priority or optimal instructions are instructions designated as being resource intensive. Instruction types that are not designated as resource intensive for a given instruction cycle are, therefore, designated as non-priority or non-resource intensive instructions.

At 504, the priority status of the instruction is determined. This designation or priority status can be based on the instruction type of the instruction, as discussed above. Additionally, in some embodiments, as discussed above, the priority status of each instruction can be indicated by a bit in a vector received from the instruction fetch unit. Furthermore, as discussed above, the instruction type designated as priority or resource intensive can be determined dynamically, such as by the instruction fetch unit, from cycle to cycle. In addition, the instruction type designated as priority or resource intensive can be determined based on historical data of instructions types dispatched in previous cycles, as discussed above. It is to be understood that the designation as resource intensive or non-resource intensive is with respect to the relative resource needs of the instruction types in a given instruction cycle. For example, in one instruction cycle, a VSU instruction type can be designated as the priority or resource intensive instruction type as compared to fixed point arithmetic instructions in the same instruction cycle. However, in another instruction cycle, the VSU instructions can be designated as non-resource intensive as compared to MMA instructions which are designated as resource intensive for that instruction cycle. Thus, the designation as resource intensive and non-resource intensive is not an absolute designation regarding the specific amount of resources needed, but rather a relative designation of expected resource needs vis a vis other instructions in the instruction cycle based on the respective instruction types.

At 506, a rotation order based on the priority status is selected. In particular, as discussed above, a first rotation order is associated with priority instructions and a second rotation order, different from the first rotation order, is associated with non-priority instructions. The second rotation order can be opposite to the first rotation order. For example, as discussed above, the dispatch unit can track the last rotation or issue queue used for each instruction type. For instance, the last rotation or issue queue used for a VSU instruction could be issue queue 222-2 (slice S1) in the example FIG. 3 and VSU instructions are selected as the priority instruction type for the current instruction cycle. Thus, at the beginning of the current instruction cycle the first rotation order associated with priority instructions is advanced to begin at the next rotation or issue queue after the last rotation used for a VSU instruction according to the first rotation order. For example, if the last rotation used for the current priority instruction type was slice S1 (issue queue 222-2) then the first rotation order for the current instruction cycle is advanced to begin at slice S3 (issue queue 222-N) according to the example rotation order discussed above with respect to FIG. 3. Thus, the first rotation order for this instruction cycle would follow a slice order of 3-0-2-1. At the beginning of the current instruction cycle, the second rotation order for non-priority instruction types is then selected to be opposite the first rotation order.

Thus, in the example described here, the second rotation order would follow a slice order of 1-2-0-3. During the instruction cycle, each instruction is routed according to one of the two rotation orders, as discussed above. After each respective instruction, only the rotation order corresponding to the respective instruction is updated. For example, during the instruction cycle, if a given instruction is routed according to the first rotation order, then only the first rotation order is updated. Similarly, during the instruction cycle, if a given instruction is routed according to the second rotation order, then only the second rotation order is updated.

At 508, an issue queue of a plurality of issue queues is selected based on the selected rotation order, as discussed above. Additionally, as discussed above, in some embodiments, each issue queue has 2 slots. In such embodiments, selecting the issue queue includes selecting the issue queue and slot based on the selected rotation order. At 510, the instruction is dispatched to the selected issue queue. Method 500 then returns to 502 for the next instruction in the instruction cycle. In some embodiments, dispatching the instruction to the selected issue queue comprises determining that the selected issue queue is busy and waiting for the selected issue queue to become available in response to determining that the selected issue queue is busy as described, for example, with respect to the illustrative embodiment in FIG. 7. In other embodiments, dispatching the instructions to the selected issue queue comprises selecting a next issue queue based on the selected rotation order in response to determining that the selected issue queue is busy and dispatching the instruction to the next issue queue as described, for example, with respect to the illustrative embodiment in FIG. 6.

Figure 6:
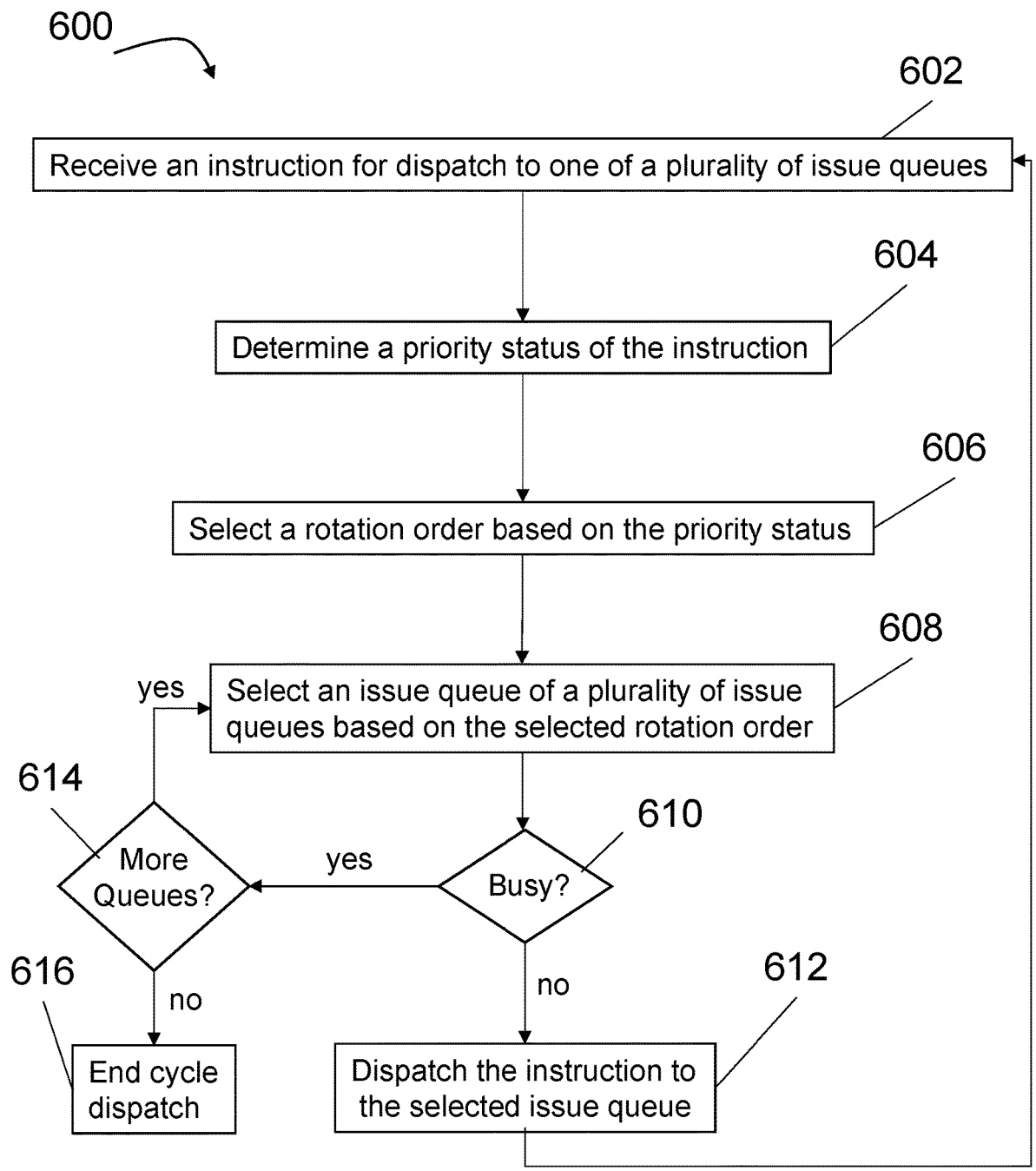
FIG. 6 is a flow chart depicting another embodiment of an example method of dispatching instructions.

FIG. 6 is a flow chart depicting another embodiment of an example method 600 of dispatching instructions. Method 600 can be implemented by a dispatch unit of a processor core, such as dispatch unit 612 discussed above. It is to be understood that the order of actions in example method 600 is provided for purposes of explanation and that the method can be performed in a different order in other embodiments. Similarly, it is to be understood that some actions can be omitted or additional actions can be included in other embodiments.

At 602, an instruction for dispatch to one of a plurality of issue queues is received. For example, in each cycle a plurality of instructions can be received from an instruction fetch unit, as described above. One or more of the instructions in each cycle can be designated as a priority or optimal instruction. As discussed above, priority or optimal instructions are instructions designated as being resource intensive. At 604, the priority status of the instruction is determined. This designation or priority status can be based on the instruction type of the instruction, as discussed above. Additionally, in some embodiments, as discussed above, the priority status of each instruction can be indicated by a bit in a vector received from the instruction fetch unit. Furthermore, as discussed above, the instruction type designated as priority or resource intensive can be determined dynamically, such as by the instruction fetch unit, from cycle to cycle. In addition, the instruction type designated as priority or resource intensive can be determined based on historical data of instructions types dispatched in previous cycles, as discussed above.

At 606, a rotation order based on the priority status is selected. In particular, as discussed above, a first rotation order is associated with priority instructions and a second rotation order, different from the first rotation order, is associated with non-priority instructions. The second rotation order can be opposite to the first rotation order. For example, as discussed above, the dispatch unit can track the last rotation or issue queue used for each instruction type. For instance, the last rotation or issue queue used for an MMA instruction could be issue queue 222-3 (slice S2) in the example FIG. 3 and MMA instructions are selected as the priority instruction type for the current instruction cycle. Thus, at the beginning of the current instruction cycle the first rotation order associated with priority instructions is advanced to begin at the next rotation or issue queue after the last rotation used for a MMA instruction according to the first rotation order. For example, if the last rotation used for the current priority instruction type was slice S2 (issue queue 222-3) then the first rotation order for the current instruction cycle is advanced to begin at slice S1 (issue queue 222-2) according to the example rotation order discussed above with respect to FIG. 3. Thus, the first rotation order for this instruction cycle would follow a slice order of 1-3-0-2. At the beginning of the current instruction cycle, the second rotation order for non-priority instruction types is then selected to be opposite the first rotation order. Thus, in the example described here, the second rotation order would follow a slice order of 2-0-3-1. During the instruction cycle, each instruction is routed according to one of the two rotation orders, as discussed above. After each respective instruction, only the rotation order corresponding to the respective instruction is updated. For example, during the instruction cycle, if a given instruction is routed according to the first rotation order, then only the first rotation order is updated. Similarly, during the instruction cycle, if a given instruction is routed according to the second rotation order, then only the second rotation order is updated.

At 608, an issue queue of a plurality of issue queues is selected based on the selected rotation order, as discussed above. Additionally, as discussed above, in some embodiments, each issue queue has 2 slots. In such embodiments, selecting the issue queue includes selecting the issue queue and slot based on the selected rotation order. At 610, it is determined if the selected issue queue is busy or otherwise unavailable. If the selected issue queue is not busy, then the instruction is dispatched to the selected issue queue at 612.

If the selected issue queue is busy, then it is determined at block 614 if there are additional issue queues to check, in some embodiments. In other words, at block 614 it is determined if all of the issue queues have already been checked to determine if there is an available issue queue. If there are no more issue queues to check, then the method 600 ceases dispatching instructions for that instruction cycle at block 616, in some embodiments. If there is one or more issue queues to check, then the method 600 returns to block 608 where the next issue queue in the selected rotation order is selected. If the next issue queue in the selected rotation is not busy at block 610, then the instruction is dispatched to the next issue queue at block 612 and method 600 returns to 602 for the next instruction in the cycle.

Figure 7:
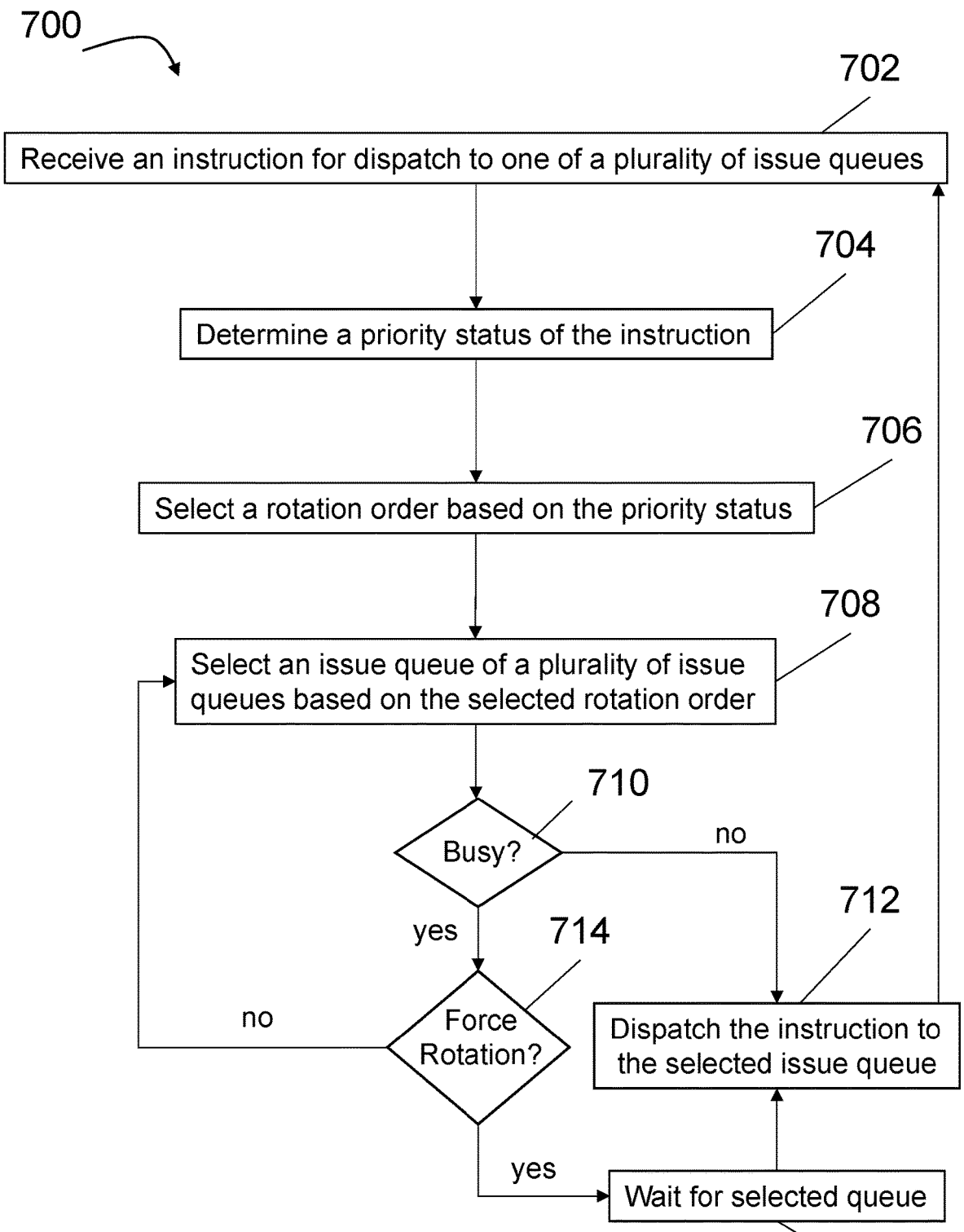
FIG. 7 is a flow chart depicting another embodiment of an example method of dispatching instructions.

FIG. 7 is a flow chart depicting another embodiment of an example method 600 of dispatching instructions. Method 700 can be implemented by a dispatch unit of a processor core, such as dispatch unit 712 discussed above. It is to be understood that the order of actions in example method 700 is provided for purposes of explanation and that the method can be performed in a different order in other embodiments. Similarly, it is to be understood that some actions can be omitted or additional actions can be included in other embodiments.

At 702, an instruction for dispatch to one of a plurality of issue queues is received. For example, in each cycle a plurality of instructions can be received from an instruction fetch unit, as described above. One or more of the instructions in each cycle can be designated as a priority or optimal instruction. As discussed above, priority or optimal instructions are instructions designated as being resource intensive. At 704, the priority status of the instruction is determined. This designation or priority status can be based on the instruction type of the instruction, as discussed above. Additionally, in some embodiments, as discussed above, the priority status of each instruction can be indicated by a bit in a vector received from the instruction fetch unit. Furthermore, as discussed above, the instruction type designated as priority or resource intensive can be determined dynamically, such as by the instruction fetch unit, from cycle to cycle. In addition, the instruction type designated as priority or resource intensive can be determined based on historical data of instructions types dispatched in previous cycles, as discussed above.

At 706, a rotation order based on the priority status is selected. In particular, as discussed above, a first rotation order is associated with priority instructions and a second rotation order, different from the first rotation order, is associated with non-priority instructions. The second rotation order can be opposite to the first rotation order. For example, as discussed above, the dispatch unit can track the last rotation or issue queue used for each instruction type. For instance, the last rotation or issue queue used for a L/S instruction could be issue queue 222-1 (slice S0) in the example FIG. 3 and L/S instructions are selected as the priority instruction type for the current instruction cycle. Thus, at the beginning of the current instruction cycle, the first rotation order associated with priority instructions is advanced to begin at the next rotation or issue queue after the last rotation used for a L/S instruction according to the first rotation order. For example, if the last rotation used for the current priority instruction type was slice S0 (issue queue 222-1) then the first rotation order for the current instruction cycle is advanced to begin at slice S2 (issue queue 222-3) according to the example rotation order discussed above with respect to FIG. 3. Thus, the first rotation order for this instruction cycle would follow a slice order of 2-1-3-0. At the beginning of the current instruction cycle, the second rotation order for non-priority instruction types is then selected to be opposite the first rotation order. Thus, in the example described here, the second rotation order would follow a slice order of 0-3-1-2. During the instruction cycle, each instruction is routed according to one of the two rotation orders, as discussed above. After each respective instruction, only the rotation order corresponding to the respective instruction is updated. For example, during the instruction cycle, if a given instruction is routed according to the first rotation order, then only the first rotation order is updated. Similarly, during the instruction cycle, if a given instruction is routed according to the second rotation order, then only the second rotation order is updated.

At 708, an issue queue of a plurality of issue queues is selected based on the selected rotation order, as discussed above. Additionally, as discussed above, in some embodiments, each issue queue has 2 slots. In such embodiments, selecting the issue queue includes selecting the issue queue and slot based on the selected rotation order. At 710, it is determined if the selected issue queue is busy or otherwise unavailable. If the selected issue queue is not busy, then the instruction is dispatched to the selected issue queue at 712.

If the selected issue queue is busy, then it is determined at block 714 if force rotation is on for the given instruction type. For example, a bit can be set to indicate that the rotation should be forced for the given instruction type, as discussed above. If force rotation is on at block 714, then the dispatch unit waits at block 716 until the selected issue queue becomes available. As discussed above, in some embodiments, a time limit can applied to limit the amount of time that the dispatch unit waits for the selected issue queue. Once the selected issue queue becomes available, the instruction is dispatched to the selected issue queue at block 712. If force rotation is turned off at block 714 for the given instruction type, then method 700 returns to block 708 where the next issue queue in the selected rotation order is selected and method 700 continues to block 710 to determine if the next issue queue in the rotation order is busy. If the next issue queue is not busy, then the instruction is dispatched to the next issue queue at block 714. Method 700 then returns to 702 for the next instruction in the instruction cycle.

Thus, through the techniques described herein, each of the plurality of instructions in a cycle is dispatched using one of two different rotation orders based on the priority status of the respective instructions. In particular, each of one or more instructions designated as resource intensive or priority is dispatched to a respective one of the plurality of issue queues according to a first rotation order and each of one or more instructions designated as non-resource intensive or non-priority is dispatched to a respective one of the plurality of issue queues according to a second rotation order. As discussed herein, the dispatching of instructions using two different rotation orders for priority and non-priority instructions improves the ability of the processor core to evenly distribute the workload across the issue queues and execution units which results in improved performance as compared to conventional processors and systems.

EXAMPLE EMBODIMENTS

Example 1 includes a method comprising receiving an instruction for dispatch to one of a plurality of issue queues; determining a priority status of the instruction; selecting a rotation order based on the priority status, wherein a first rotation order is associated with priority instructions and a second rotation order, different from the first rotation order, is associated with non-priority instructions; selecting an issue queue of the plurality of issue queues based on the selected rotation order; and dispatching the instruction to the selected issue queue.

Example 2 includes the method of example 1, wherein determining the priority status of the instruction includes checking a bit corresponding to the instruction in a vector received from an instruction fetch unit.

Example 3 includes the method of any of examples 1-2, wherein determining the priority status of the instruction is based on an instruction type of the instruction; wherein one instruction type is designated as priority and at least one instruction type is designated as non-priority; wherein the first rotation order is adjusted to begin at a next issue queue in the first rotation order after a last used issue queue for the instruction type designated as priority; and wherein the second rotation order is adjusted to be opposite to the first rotation order.

Example 4 includes the method of example 3, wherein the instruction type designated as priority is determined dynamically from cycle to cycle.

Example 5 includes the method of any of examples 3-4, wherein an instruction type designated as priority is determined based on historical data of instructions types dispatched in previous cycles.

Example 6 includes the method of any of examples 1-5, wherein each issue queue has 2 slots; and wherein selecting the issue queue includes selecting the issue queue and slot based on the selected rotation order.

Example 7 includes the method of any of examples 1-6, wherein dispatching the instruction to the selected issue queue further comprises determining that the selected issue queue is busy; and waiting for the selected issue queue to become available in response to determining that the selected issue queue is busy.

Example 8 includes the method of any of examples 1-7, wherein dispatching the instruction to the selected issue queue further comprises determining that the selected issue queue is busy; selecting a next issue queue based on the selected rotation order in response to determining that the selected issue queue is busy; and dispatching the instruction to the next issue queue.

Example 9 includes a method comprising receiving a plurality of instructions in a cycle, the plurality of instructions including one or more instructions designated as resource intensive and one or more instructions designated as non-resource intensive; dispatching each of the one or more instructions designated as resource intensive to a respective one of a plurality of issue queues according to a first rotation order; and dispatching each of the one or more instructions designated as non-resource intensive to a respective one of the plurality of issue queues according to a second rotation order opposite to the first rotation order.

Example 10 includes the method of example 9, further comprising tracking a position in the first rotation order and a position in the second rotation order for use in a subsequent cycle.

Example 11 includes the method of any of examples 9-10, wherein the plurality of issue queues are divided into a first group and a second group operating independently of the first group; and wherein each of the first group and the second group is associated with both a respective first rotation order for resource intensive instructions and a respective second rotation order non-resource intensive instructions.

Example 12 includes the method of any of examples 9-11, wherein at least two of the plurality of instructions are paired instructions; wherein the method further comprises pairing each of the non-paired instructions with another non-paired instruction; and wherein dispatching each of the one or more instructions designated as resource intensive comprises dispatching each of the one or more instructions designated as resource intensive together with another of the plurality of instructions according to the first rotation order; and wherein dispatching each of the one or more instructions designated as non-resource intensive comprises dispatching each of the one or more instructions designated as non-resource intensive paired with another non-resource intensive instruction according to the second rotation order.

Example 13 includes a processor comprising an instruction fetch unit; a dispatch unit communicatively coupled to the instruction fetch unit; and a plurality of issue queues communicatively coupled to the dispatch unit. The dispatch unit is configured to receive a plurality of instructions from the instruction fetch unit; determine a respective priority status for each of the plurality of instructions; select a rotation order for each of the plurality of instructions based on the respective priority status, wherein a first rotation order is associated with priority instructions and a second rotation order, different from the first rotation order, is associated with non-priority instructions; select a respective issue queue of the plurality of issue queues for each of the plurality of instructions based on the respective selected rotation order; and dispatch each of the plurality of instruction to the respective selected issue queue.

Example 14 includes the processor of example 13, wherein the dispatch unit is configured to determine the priority status of each of the plurality of instructions by checking a bit corresponding to each instruction in a vector received from the instruction fetch unit.

Example 15 includes the processor of any of examples 13-14, wherein the instruction fetch unit is configured to determine the respective priority status of each instruction based on a respective instruction type of each instruction.

Example 16 includes the processor of any of examples 13-15, wherein the instruction fetch unit is configured to determine an instruction type designated as priority dynamically from cycle to cycle.

Example 17 includes the processor of any of examples 13-16, wherein the instruction fetch unit is configured to determine an instruction type designated as priority based on historical data of instructions types dispatched in previous cycles.

Example 18 includes the processor of any of examples 13-17, wherein each issue queue of the plurality of issue queues has 2 slots; and wherein select the respective issue queue of the plurality of issue queues for each of the plurality of instructions includes selecting the respective issue queue and slot based on the respective selected rotation order.

Example 19 includes the processor of any of examples 13-18, wherein the dispatch unit is further configured to determine that the respective selected issue queue for a given one of the plurality of instructions is busy and to wait to dispatch the given one of the plurality of instructions until the respective selected issue queue becomes available.

Example 20 includes the processor of any of examples 13-19, wherein the dispatch unit is further configured to determine that the respective selected issue queue for a given one of the plurality of instructions is busy, to select a next issue queue based on the respective selected rotation order in response to determining that the respective selected issue queue is busy, and to dispatch the given one of the plurality of instructions to the next issue queue.

Example 21 includes a computer system comprising a memory configured to store program code; and a processor communicatively coupled to the memory and configured to execute the program code. The processor comprises an instruction fetch unit; a dispatch unit communicatively coupled to the instruction fetch unit; and a plurality of issue queues communicatively coupled to the dispatch unit. The dispatch unit is configured to receive a plurality of instructions in a cycle, the plurality of instructions including one or more instructions designated as resource intensive and one or more instructions designated as non-resource intensive; dispatch each of the one or more instructions designated as resource intensive to a respective one of the plurality of issue queues according to a first rotation order; and dispatch each of the one or more instructions designated as non-resource intensive to a respective one of the plurality of issue queues according to a second rotation order opposite to the first rotation order.

Example 22 includes the computer system of example 21, wherein the dispatch unit is further configured to track a position in the first rotation order and a position in the second rotation order for use in a subsequent cycle.

Example 23 includes the computer system of any of examples 21-22, wherein the plurality of issue queues are divided into a first group and a second group operating independently of the first group; and wherein each of the first group and the second group is associated with both a respective first rotation order for resource intensive instructions and a respective second rotation order non-resource intensive instructions.

Example 24 includes the computer system of any of examples 21-23, wherein at least two of the plurality of instructions are paired instructions; wherein the dispatch unit is further configured to dispatch the plurality of instructions in pairs such that each of the one or more instructions designated as resource intensive is dispatched together with another of the plurality of instructions according to the first rotation order and each of the one or more instructions designated as non-resource intensive that is paired with another instruction designated as non-resource intensive is dispatched according to the second rotation order.

Example 25 includes the computer system of any of examples 21-24, wherein the instruction fetch unit is configured to dynamically determine an instruction type designated as resource intensive for each cycle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
receiving an instruction for dispatch to one of a plurality of issue queues;
determining a resource intensity of the instruction;
selecting a rotation order based on the resource intensity, wherein a first rotation order is associated with instructions designated as resource intensive and a second rotation order, different from the first rotation order, is associated with instructions designated as non-resource intensive;
selecting an issue queue of the plurality of issue queues based on the selected rotation order; and
dispatching the instruction to the selected issue queue.

2. The method of claim 1, wherein the instruction type designated as resource intensive is determined dynamically from cycle to cycle.

3. The method of claim 1, wherein each issue queue has 2 slots; and
wherein selecting the issue queue includes selecting the issue queue and slot based on the selected rotation order.

4. The method of claim 1, wherein dispatching the instruction to the selected issue queue further comprises:
determining that the selected issue queue is busy; and
waiting for the selected issue queue to become available in response to determining that the selected issue queue is busy.

5. The method of claim 1, wherein dispatching the instruction to the selected issue queue further comprises:
determining that the selected issue queue is busy;
selecting a next issue queue based on the selected rotation order in response to determining that the selected issue queue is busy; and
dispatching the instruction to the next issue queue.

6. A method comprising:
receiving a plurality of instructions in a cycle, the plurality of instructions including one or more instructions designated as resource intensive and one or more instructions designated as non-resource intensive;

dispatching each of the one or more instructions designated as resource intensive to a respective one of a plurality of issue queues according to a first rotation order; and dispatching each of the one or more instructions designated as non-resource intensive to a respective one of the plurality of issue queues according to a second rotation order opposite to the first rotation order.

7. The method of claim 6, further comprising tracking a position in the first rotation order and a position in the second rotation order for use in a subsequent cycle.

8. The method of claim 6, wherein the plurality of issue queues are divided into a first group and a second group operating independently of the first group; and wherein each of the first group and the second group is associated with both a respective first rotation order for resource intensive instructions and a respective second rotation order for non-resource intensive instructions.

9. The method of claim 6, wherein at least two of the plurality of instructions are paired instructions;

wherein the method further comprises pairing each of the non-paired instructions with another non-paired instruction; and wherein dispatching each of the one or more instructions designated as resource intensive comprises dispatching each of the one or more instructions designated as resource intensive together with another of the plurality of instructions according to the first rotation order; and wherein dispatching each of the one or more instructions designated as non-resource intensive comprises dispatching each of the one or more instructions designated as non-resource intensive paired with another non-resource intensive instruction according to the second rotation order.

10. A processor comprising:
an instruction fetch unit;
a dispatch unit communicatively coupled to the instruction fetch unit; and
a plurality of issue queues communicatively coupled to the dispatch unit;
wherein the dispatch unit is configured to:
receive a plurality of instructions from the instruction fetch unit;
determine a respective resource intensity for each of the plurality of instructions;
select a rotation order for each of the plurality of instructions based on the respective resource intensity, wherein a first rotation order is associated with instructions designated as resource intensive and a second rotation order, different from the first rotation order, is associated with instructions designated as non-resource intensive;
select a respective issue queue of the plurality of issue queues for each of the plurality of instructions based on the respective selected rotation order; and
dispatch each of the plurality of instruction to the respective selected issue queue.

11. The processor of claim 10, wherein the instruction fetch unit is configured to determine an instruction type designated as resource intensive dynamically from cycle to cycle.

12. The processor of claim 10, wherein each issue queue of the plurality of issue queues has 2 slots; and wherein select the respective issue queue of the plurality of issue queues for each of the plurality of instructions includes selecting the respective issue queue and slot based on the respective selected rotation order.

13. The processor of claim 10, wherein the dispatch unit is further configured to determine that the respective selected issue queue for a given one of the plurality of instructions is busy and to wait to dispatch the given one of the plurality of instructions until the respective selected issue queue becomes available.

14. The processor of claim 10, wherein the dispatch unit is further configured to determine that the respective selected issue queue for a given one of the plurality of instructions is busy, to select a next issue queue based on the respective selected rotation order in response to determining that the respective selected issue queue is busy, and to dispatch the given one of the plurality of instructions to the next issue queue.

15. A computer system comprising:
a memory configured to store program code; and
a processor communicatively coupled to the memory and configured to execute the program code, wherein the processor comprises:
an instruction fetch unit;
a dispatch unit communicatively coupled to the instruction fetch unit; and
a plurality of issue queues communicatively coupled to the dispatch unit;
wherein the dispatch unit is configured to:
receive a plurality of instructions in a cycle, the plurality of instructions including one or more instructions designated as resource intensive and one or more instructions designated as non-resource intensive;
dispatch each of the one or more instructions designated as resource intensive to a respective one of the plurality of issue queues according to a first rotation order; and
dispatch each of the one or more instructions designated as non-resource intensive to a respective one of the plurality of issue queues according to a second rotation order opposite to the first rotation order.

16. The computer system of claim 15, wherein the dispatch unit is further configured to track a position in the first rotation order and a position in the second rotation order for use in a subsequent cycle.

17. The computer system of claim 15, wherein the plurality of issue queues are divided into a first group and a second group operating independently of the first group; and wherein each of the first group and the second group is associated with both a respective first rotation order for resource intensive instructions and a respective second rotation order for non-resource intensive instructions.

18. The computer system of claim 15, wherein at least two of the plurality of instructions are paired instructions;

wherein the dispatch unit is further configured to dispatch the plurality of instructions in pairs such that each of the one or more instructions designated as resource intensive is dispatched together with another of the plurality of instructions according to the first rotation order and each of the one or more instructions designated as non-resource intensive that is paired with another instruction designated as non-resource intensive is dispatched according to the second rotation order.

19. The computer system of claim 15, wherein the instruction fetch unit is configured to dynamically determine an instruction type designated as resource intensive for each cycle.

20. The method of claim 1, further comprising tracking a position in the first rotation order and a position in the second rotation order for use in a subsequent cycle.

21. The method of claim 1, wherein the plurality of issue queues are divided into a first group and a second group operating independently of the first group; and wherein each of the first group and the second group is associated with both a respective first rotation order for resource intensive instructions and a respective second rotation order for non-resource intensive instructions.

22. The processor of claim 10, wherein the dispatch unit is further configured to track a position in the first rotation order and a position in the second rotation order for use in a subsequent cycle.

23. The processor of claim 10, wherein the plurality of issue queues are divided into a first group and a second group operating independently of the first group; and wherein each of the first group and the second group is associated with both a respective first rotation order for resource intensive instructions and a respective second rotation order for non-resource intensive instructions.

24. The processor of claim 10, wherein at least two of the plurality of instructions are paired instructions;

wherein the dispatch unit is further configured to dispatch the plurality of instructions in pairs such that each of the one or more instructions designated as resource intensive is dispatched together with another of the plurality of instructions according to the first rotation order and each of the one or more instructions designated as non-resource intensive that is paired with another instruction designated as non-resource intensive is dispatched according to the second rotation order.

* * * * *